United States Patent [19]

Shinagawa et al.

[11] Patent Number: 5,106,241
[45] Date of Patent: Apr. 21, 1992

[54] MULTI MATERIAL SWITCHING TYPE COLLECTOR

[75] Inventors: Shuji Shinagawa; Mitsutoshi Nishida; Masaaki Nosaka, all of Hirakata, Japan

[73] Assignee: Matsui Manufacturing Co., Ltd., Osaka, Japan

[21] Appl. No.: 568,094

[22] Filed: Aug. 14, 1990

[51] Int. Cl.⁵ ............................................. B65G 51/24
[52] U.S. Cl. ........................................................ 406/182
[58] Field of Search ................................ 406/1, 2, 182

[56] References Cited

U.S. PATENT DOCUMENTS

| | | | |
|---|---|---|---|
| 631,373 | 8/1899 | Luce | 406/182 X |
| 3,681,191 | 8/1972 | Farrelly | 406/182 X |
| 4,886,401 | 12/1989 | Andrews et al. | 406/182 |

FOREIGN PATENT DOCUMENTS

| | | | |
|---|---|---|---|
| 63255 | 10/1982 | European Pat. Off. | 406/1 |
| 908474 | 4/1954 | Fed. Rep. of Germany | 406/182 |
| 1456761 | 3/1969 | Fed. Rep. of Germany | 406/182 |
| 143719 | 8/1961 | U.S.S.R. | 406/182 |
| 733013 | 7/1955 | United Kingdom | 406/182 |
| 2040023 | 8/1980 | United Kingdom | 406/182 |

Primary Examiner—Margaret A. Focarino
Assistant Examiner—Gary C. Hoge
Attorney, Agent, or Firm—Koda and Androlia

[57] ABSTRACT

The present invention is concerned with a collector, used for supplying powdered or granular materials such as various kinds of raw materials for plastic to a plastic molding machine, which can automatically switch multi-materials. The collector comprises a separation box connected to a main body of the collector, a rotary valve being pressed to a vacant chamber of the separation box for being mounted thereto such that the rotary valve may be rotatable to and fro, and a separator provided on a bottom of the rotary valve and is constructed such that a rotational displacement of the rotary valve permits a passage for guiding materials to communicate selectively with an inlet of materials and a gas introducing port to execute replacement of materials and compressed gas can be supplied from the gas introducing port, when a coincidence between the gas introducing port and the passage for guiding materials is made.

17 Claims, 10 Drawing Sheets

MULTI MATERIAL SWITCHING TYPE COLLECTOR

BACKGROUND OF THE INVENTION

1. Field of the Invention

The present invention relates to a multi-material switching type collector for separating and collecting powdered or granular materials (here-in-after referred to as materials), dust (including mist in a wide sense; hereinafter this definition is to be adopted.), and transporting gas, which is incorporated into a pneumatic force transporting apparatus for transporting materials, raw materials for plastic, medicine, processed foods and the like, from a material supplying source through a transport pipe to a destination including a synthetic resin molding machine and the like, using the pneumatic force generated from sucked-in or pressurized transporting gas such as air, nitrogen gas and the like.

2. Prior Art

Recently, the plastic molding work and the like require multi-kind of products along with minimizing their producing lot. In order to meet such requirements, as shown in FIG. 11, the pneumatic force transporting for the materials capable of transporting various kinds of materials to one optional destination is proposed.

The conventional pneumatic force transporting apparatus takes an arrangement in which a plurality of hoppers $A_1$, $A_2$, $A_3$ ... for storing materials of a different kind respectively are connected to the one transport pipe B, rotary valves D, controlled to be opened or closed by control panel C, are provided at outlet ends of the hoppers $A_1$, $A_2$, $A_3$ ..., the one collector F, mounted to such a transporting destination as the plastic molding machine E, is connected to the opposite end of the transport pipe B, and, under such an arrangement, an operation of the control panel permits the desired rotary valve D of the hopper $A_1$ ... to be opened, thereby sucking in the desired materials to collector F by means of pneumatic force source G so that the materials, the transporting gas, and the dust are separated from one another at the collector F, only the materials being supplied to the plastic molding machine E.

When transporting the materials, optionally selected from a plurality of hoppers $A_1$, $A_2$, ..., to the destination, however, since the conventional model having afore-mentioned construction performs all of their transportations by way of the same transport pipe B, it possesses a problematic point that the last transportation before the present one causes an adherent residue of the materials of a different kind to take place in the transport pipe B or the collector F, whereby a mixture of the materials is incurred at their replacement. When molding the plastic, for example, if the molding process is performed under the afore-mentioned state of the mixture, the finished moldings become improper.

For this reason, resulting drawbacks of the conventional model are that, in order to avoid the afore-mentioned mixture of the materials, there are necessities of air-blowing the inside of the transport pipe B by compressed air or performing such a laborious and time-consuming cleaning work as an climination of the residual materials adhered to a filter and the like in the collector F every a replacement of the materials and that, in addition to inability of reducing time necessary for the replacement of the materials, a special apparatus for air-blowing becomes needed.

SUMMARY OF THE INVENTION

The primary object of the present invention is to solve the problems described above and provide the multimaterial switching type collector capable not only of taking a shorter time to automate the replacing process of the materials which is required at the production mode of small lot along with various kinds of products being made but also of preventing a mixture of materials of a different kind.

Another object of the present invention is to provide the multi-material switching type collector causing no adherent residue of the materials and the dust to take place at the places including an inlet of the materials of the collector, a passage for guiding the materials, a separator and the like, automating an elimination of such a residue, even if it occurs, and making it unnecessary to execute such a laborious and time-consuming elimination work of the dust and the like as conventionally needed.

A further object of the present invention is to provide the multi-material switching type collector capable of separating and collecting efficiently the materials, the dust, and the transporting gas and of avoiding a trouble in which the materials become caught somewhere in its transportation.

A still further object, characteristics, and merits of the present invention shall be made apparent by the following description.

In order to attain the afore-mentioned objects, the present invention takes a construction in which a rotary valve not only being pressed to an inside wall face of separation box for its mounting thereto such that it may be always rotatable to and fro, but also having the one passage for guiding the materials, and a separator located at the bottom of the rotary valve are provided in a vacant chamber of the separation box to be connected to the main boxy of the collector, a plurality of the inlets of the materials, gas introducing ports, and exhaust ports are formed on the outer wall of the separation box, and while a rotatable displacement of the rotary valve permits the inlets of the materials and gas introducing ports to communicate selectively with the passage for guiding the materials of the rotary valve so that the replacement of the materials may be made, compressed gas being supplied through the gas introducing port, when a coincidence between the gas introducing port and the passage for guiding the materials is made.

There is an alternative supplying modes of the materials to the passage for guiding the materials of the rotary valve, wherein the compressed air from an air compressing & feeding source, e.g. a blower, being connected to the passage for guiding the materials and the upper-stream side of the inlet of materials of the separation box may cause the materials to be supplied thereto, or suction gas from an air aspirating source, e.g. a vacuum pump, the blower and the like, being connected to the exhaust port side of the separation box may also perform the afore-mentioned supply process.

The separator includes an upper separator being provided under the rotary valve to communicate with the passage for guiding materials and a lower separator being disposed on the bottom side of the separation box to be opposite to the upper separator, a slit being formed between these two separators. Their form is optional.

It may be recommended that a plurality of equally spaced scrapers are disposed along the slit between the upper and lower separators, whereby the materials being apt to be caught in the slit is scraped off and, of course, a practical embodiment adopting no such an arrangement is able to be effected Also, a choice may lie in forming a gas supply means having a gas supply hole hole for supplying the gas for cleaning the inside of the main body of the collector in a connection part between the separation box and the main body of the collector.

The replacement of the materials is basically performed by a rotational displacement of the rotary valve and, at that time, it is preferably rational to utilize adequately signals, including a signal for classifying the materials, a signal for indicating a switching completion and the like, which are stored in a synthetic resin molding machine, a computer, or a memory card.

A using of the memory card, attached to a control mechanism, in which an amount of supplying the materials to the passage for guiding the materials of the rotary valve is stored, may be also a further arrangement.

It is possible to use the transport pipes, connected to the inlets of materials being formed on the outer wall of the separation box, whose inner diameter is as small as approximately equal to a dimension 2-6 times as large as the maximum diameter of particle of the materials to be transported.

A description of the action by the present invention is made as follows:

(1) A drive source permits the rotary valve to be rotated to and fro, a positional coincidence of the passage for guiding the materials of the rotary valve with the desired inlet of the materials of the separation box is made, the pressurizing feeding force or the suction force of the gas from the pressurizing-feeding system of air source generated by the blower and the like being connected to the upper-stream side of the inlet of the materials or the suction system of air source respectively generated by the vacuum pump, the blower and the like being connected to the side of the exhaust port thereof causes the desired kind of materials (powdered or granular materials) to be transported to the passage for guiding the materials of the rotary valve together with a flow of the gas, and, then, the materials, the transporting gas, and the dust are separated from one another by a separator.

At that time, a disposition of the slit between the upper separator and the lower separator which constitute as a whole the separator has the materials of larger particles, the materials of smaller particles, the dust, and the gas separated from one another at the slit in an efficient manner; the materials of larger particles fall down by way of a collecting port of the materials into the main body of the collector, while the materials of smaller particles, the dust, and the flow of gas are discharged from the exhaust port formed in the separation box.

Although inertia force of the particles falling down from the upper area allows a collision to be made between the particles caught in the slit and the particles falling down therefrom thereby clearing away the particles caught therein, usually, there may sometimes take place a trouble that such a clearing-away cannot be completely performed. At that time, the scrapers mounted along the slit between both the upper and lower separators are actuated to scrape down assuredly the materials into the main boxy of the collector.

Upon completion of supplying the specified amount of materials from the desired inlet of the materials to the passage for guiding the materials of the rotary valve, a forward and backward rotation of the rotary valve has the passage for guiding the materials and the gas introducing port brought in a line with each other and the compressed gas is supplied from the gas introducing port, whereby the adherent residue of the materials and the dust in the passage for guiding the materials, the separator and the like can be assuredly cleared away.

In addition, similarly, a supply of the compressed gas from a gas supply hole, formed in the connection part between the separation box and the main body of the collector, enables also an adherent residue of the materials and the dust in the main body of the collector to be eliminated.

Further to a continuous supply of the gas to the gas introducing port and the gas supply hole of the separation box, an intermittent supply thereof may be also executed.

(2) Next, when making a replacement from the afore-mentioned materials to a different material, what is required to be done is simply that the rotary valve is further rotated to and fro so that the passage for guiding the materials of the rotary valve may be brought in line with another desired inlet of the materials of the separation box. As stated in the item (1), the second materials are transported into the passage for guiding the materials of the rotary valve by means of the air source and the materials, the transporting gas, and the dust are separated from one another by the separator. Then, each of actions effected by the slit of the separator, the scrapers, and the compressed gas from the gas introducing port and the gas supply hole is in a position to fulfill such a function as stated in the item (1).

(3) When making a further replacement with a still different material, as stated above, it meets the requirements, only if the rotary valve is still further rotated to and fro so that the desired passage for guiding the materials of the rotary valve may be brought in line with still another desired inlet of the materials thereof, the same operation as stated in the item (2) being repeated.

Thus, a repetition of the afore-mentioned operations may enable the replacements of the materials to be performed as many times as possible.

If the replacement of the materials by the rotational displacement of the rotary valve is performed by the signals, including the signal for classifying the materials, the signal for indicating the switching completion, which are stored in the synthetic resin molding machine, the computer, or the memory card, an electrically automatic processing for the replacement of the materials becomes possible. Furthermore, an amount of supplying the materials to the passage for guiding the materials of the rotary valve is stored in the memory card attached to the control mechanism and a using of such a memory card will allow a management of using amount of each of the materials to be executed.

The transport pipes, connected to the inlets of materials respectively being formed on the outer wall of the separation box, whose inner diameter is as small as approximately equal to the dimension 2-6 times as large as the maximum diameter of the particle of the materials to be transported may be usable.

That makes it possible to connect the transport pipes of smaller diameter to a plurality inlets of materials being formed in the small-sized collector, whereby, in addition to a possibility of minimizing the installation space, such many merits as a free replacement of the transport pipe, a reduction of its bulkiness and the like can be attained.

Since the rotary valve is pressed to the inner wall face of the separation box for being mounted such that it may be always rotated to and fro, it fulfills a satisfactory sealing effect.

BRIEF DESCRIPTION OF THE DRAWING

FIGS. 1 to 7 illustrate one embodiment of the present invention, in which:

FIG. 1 is an enlarged longitudinal sectional view of a principal part of FIG. 2;

FIG. 2 is a front view;

FIG. 3 is a plan view taken from the line III—III of FIG. 1;

FIG. 4 is a partially longitudinal sectional view taken from the right side face of FIG. 2;

FIG. 5 is a plan view taken from the line V—V of FIG. 1;

FIG. 6 (A) is a plan view of a scraper;

FIG. 6 (B) is a front view of the afore-mentioned scraper;

FIG. 7 is an outline of plan view illustrating a state of supplying the gas to the gas introducing port and the gas supply port;

DETAILED DESCRIPTION OF THE INVENTION

Figure 1:
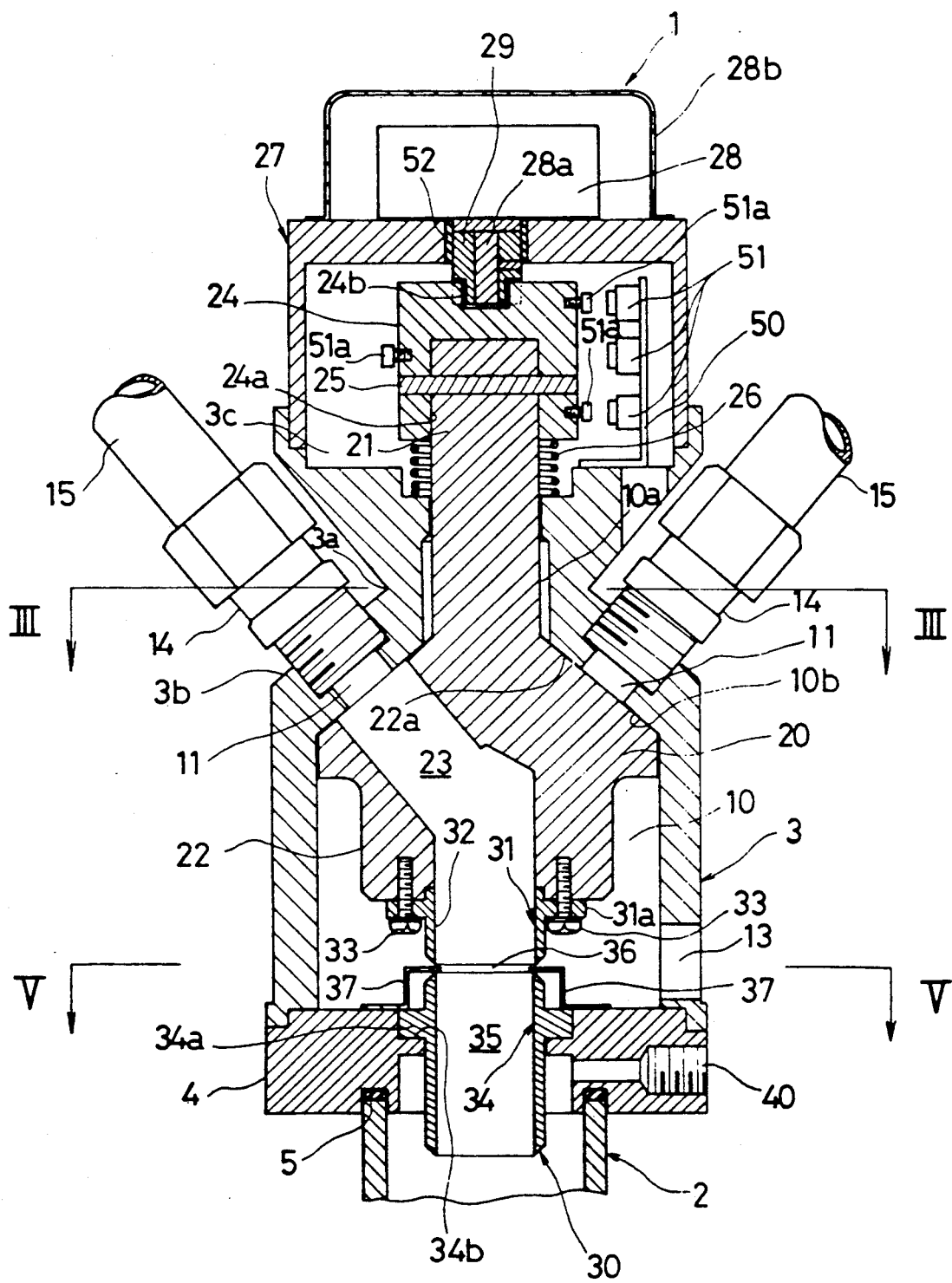

A description of the one embodiment of the present invention is made in conjunction with FIGS. 1 to 7 as follows:

1 is the collector in use for the pneumatic force transporting apparatus (not shown) for transporting the powdered or granular materials (hereinafter referred to as materials) including the material for molding plastic and the like from the materials supplying source through the transport pipe to the synthetic resin molding machine (not shown), utilizing the pneumatic force generated by sucking-in or pressuring-feeding of the transporting gas from the pneumatic force source including the blower, the compressor and the like.

The collector 1 comprises the main body of the collector 2 for collecting the materials, the separation box 3 being provided on the upper stream side of the main body of the collector 2 and the like. Under the present embodiment, the main body of the collector 2 has its upper part equipped by way of packings 5 with a lid part 4 which acts as a role of a bottom plate of the separation box 3 at the same time and lower part of the main body of the collector 2 equipped with a bottom lid part 6 (see FIG. 2.) In that case, the lid part 4 and the bottom lid part 6 may be not separately mounted thereto, but formed integrally to the main body of the collector as one unit. The separation box 3 is fixed onto the lid part 4, while a part for receiving the synthetic resin molding machine and the like is connected to the lower part of the bottom lid part 6.

The separation box 3, making a diameter of its neck part 3a smaller, has a vacant chamber 10, approximately funnel-shaped, formed in its inside and a plurality of inlets of materials 11, 11, . . . , the gas introducing port 12 formed on a shoulder part 3b of its outer wall, the exhaust port 13 being also formed in the outer part of its body. A exhaust filter or a suction type pneumatic force source (not shown) is connected to the exhaust port 13. The rotary valve 20 and the separator 30 are provided in the vacant chamber 10 of the separation box 3.

The rotary valve 20 has a cylindrical rotating shaft 21 and a small-screw-head-shaped valve body 22 formed continuously in its upper and lower parts respectively. The passage for guiding the materials 23 communicating with any of inlets of materials 11 of the separation box 3 penetrates the section running from an upper taper face 22a of the valve body 22 to a lower central part thereof. The rotating shaft 21 of the rotary valve 20 is inserted from the lower part of the vacant chamber 10 in the separation box 3 into a shaft hole 10a in the vacant chamber 10 to be protruded up to an area over an upper opening 3c in the separation box 3 so that the upper end part of the rotating shaft 21 is fitly inserted into a sleeve hole 24a, a connection being made between such an upper end part thereof and the sleeve 24 by means of a connecting pin 25. Further to that, a spring 26 is interposed between a bottom face of the upper opening 3c and a lower face of the sleeve 24, whereby a constantly upward movement of the rotary valve 20, urged by springing force of the spring 26, permits the taper face 22a of the valve body 22 of the rotary valve 20 to be always airtightly pressed to valve bearing surfaces 10b, which constitute partially the inner wall face of the vacant chamber 10 in the separation box 3, for its mounting, resulting in a contrivance of preventing a leakage of the materials, the dust, and the transporting gas from the parts where the passage for guiding the materials communicates or does not communicate with any of the inlets of materials 11, 11, . . . and the gas introducing port 12.

While the rotational displacement of the rotary valve 20 causes any of the inlets of materials 11, 11 . . . and the gas introducing port 12 to communicate collectively with the passage for guiding the materials 23 of the rotary valve 20, thereby performing the replacement of the materials, a supply of the compressed gas, generated by the compressor, from the gas introducing port 12 at a coincidence between the gas introducing port 12 and the passage for guiding the materials 23 is intended to eliminate the adherent residue of the materials, the dust and the like from the inlets of materials 11, the passage for guiding the materials 23, the separator 30 which is to be referred shortly and the like.

It is satisfactorily accepted also to adopt a manual means including a lever, a handle and the like as one of switching rotationally the rotary valve 20, and, under the present embodiment, an automatic system is adopted. Namely, the upper part of the separation box 3 is furnished with a drive source mounting base 27, such a drive source 28 as the motor and the like is mounted to the drive source mounting base 27, and a fitting of a clutch joint 29 attached to a drive shaft 28a of the drive source 28 into a receptacle hole 24b of the sleeve 24 enables a rotational force of the drive source 28 to be transmitted to the rotary valve 20, thereby giving rise to the rotational displacement of the rotary valve 20 so that a mechanic possibility is attained in which the passage for guiding the materials 23 can be optionally switched to coincide with any of a plurality of the inlets of materials 11 and the gas introducing port 12. Position detecting sensors 51, 51a . . . , provided on a bracket 50 being mounted in a void place between the outer side wall of the drive source mounting base 27 and the sleeve 24 and on the outer peripheral side wall of the sleeve 24, are to detect a state where the passage for guiding the materials 23 communicates with any desired one of the inlets of materials 11, 11 . . . and the gas introducing port 12, thereby making it possible to perform properly the afore-mentioned switching.

FIG. 1, 28b is a cover for the drive source and 52 is a bearing.

The separator 30, provided on the bottom side of the rotary valve 20, is aid to be able to choose its own shape, and, under the present embodiment, the separator 30 comprises the upper separator 31 which is provided on the lower part of the rotary valve 20 to communicate with the passage for guiding the materials 23 and the lower separator 34, disposed on the place opposite to the position of the upper separator 31, which is located at the bottom part of the separation box 3, the slit 36 being formed between the upper separator 31 and the lower separator 34.

Figure 6A:
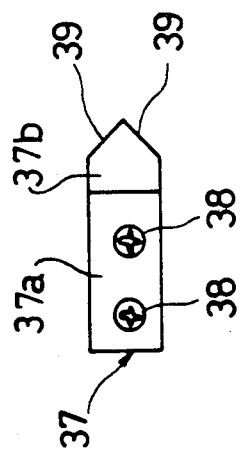
Figure 6B:
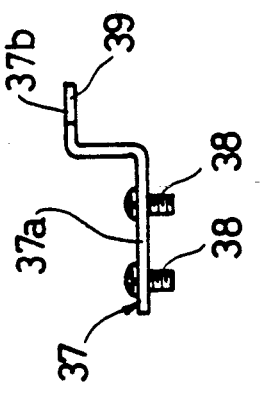

Namely, as shown in FIG. 1, the upper separator 31, nozzle-shaped, has its flanges 31a fixed to the lower face of the rotary valve 20 by bolts 33 under a state where its guide passage communicates with the passage for guiding the materials 23. On the other hand, the lower separator 34, nozzle-shaped and a little longer than the upper separator 31, makes its guide passage 35 communicate with the guide passage 32 of the upper separator 31, and has its flanges 34a, being formed on its upper part, fitly housed and fixed into upper recessed parts 34b of the lid 4, its lower part facing the inside of the main body of the collector 2. The compressed gas is led in from the gas supply hole 40, connected to such a pneumatic force source as the compressor and the like, which is formed on the lid 4 acting as a role of the connecting part between the separation box 3 and the main body of the collector 2, so that a cyclone effect may take place, whereby the inside of the main body of the collector 2 is cleaned, the dust and the like being discharged from an exhaust port 13. Such scrapers 37 of crooked shape as illustrated in FIGS. 1, 5, 6(A), & 6(B) face the slit 36. Their shape and quantity may be adequately designed to be changed and, under the present embodiment, as shown in FIGS. 6(A) & 6(B), their lower piece 37a is fixed to the upper face of the lid 4, serving as a bottom plate of the separation box 3 at the same time, by means of small screws 38, while their upper piece 37b has its top end part tapered. A provision of such scrapers 37, even if the materials become caught in the slit 36, enables a rotation of the lower end of the upper separator 31 which is rotated together with the rotary valve 20 to drop down the materials, while bringing them in contact with the taper face 39 of the scrapers 37.

Figure 7:
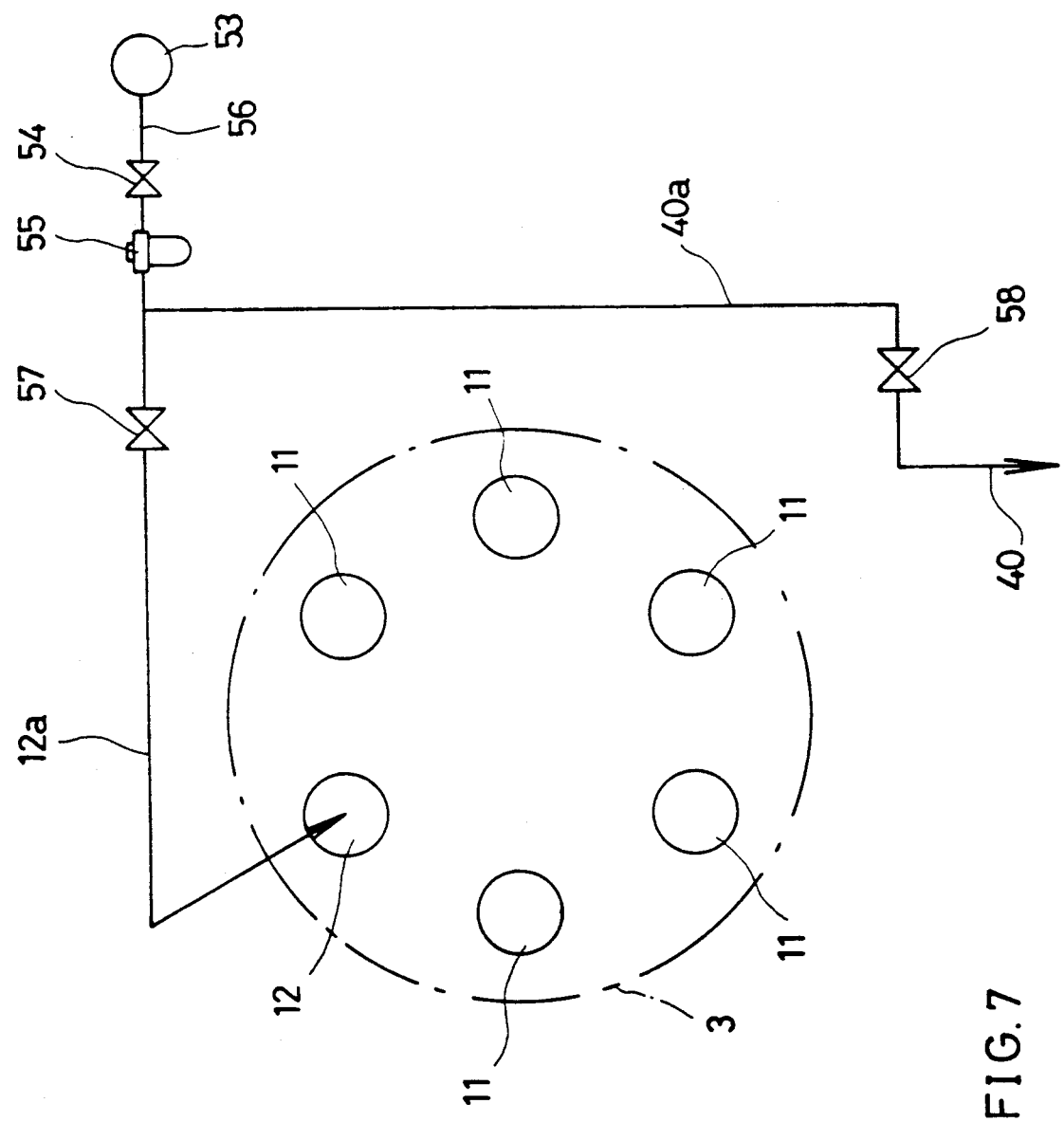

In addition to a possibility of supplying the gas to the gas introducing port 12 formed on the outer wall of the separation box 3 and to the gas supply hole 40 in the connection part (i.e. the lid 4 under the present embodiment) between the separation box 3 and the main body of the collector 2 from the separate pneumatic force sources respectively including the compressor and the like, other various kinds of designs can be available for use. The present embodiment makes a supply from such a same pneumatic force source 53 as the blower and the like as shown in FIG. 7. Namely, a gas conduit tube 56 is connected to the pneumatic force source 53 and a valve 54 and a pressure regulating valve 55 are mounted to positions respectively directed toward the downstream of the gas conduit tube 56, while the top end of the gas conduit tube 56 branches off to a first branch pipe 12a and a second branch pipe 40a, which are connected by way of switching valves 57 and 58 to the gas introducing port 12 and the gas supply hole 40 respectively.

Joints 14, 14 . . . are connected to the inlets of materials, 11, 11 . . . and the gas introducing port 12 formed on the separation box 3 and, among these joints 14 and 14 . . . , the transport pipes 15 are connected to ones 14, 14 . . . being connected to the inlets of the materials 11, 11 . . . In that case, of course, the transport pipe 15, generally used, whose inner diameter is about over 40 mm may be adoptable and according to the present invention, stated above, a using of the transport pipe whose inner diameter is as small as the dimension approximately 2-6 times as long as the maximum length of the particle of the materials to be transported, can attain the expected aim without being clogged with the materials. For example, about 10 mm or so of the inner diameter may be accepted.

Figure 2:
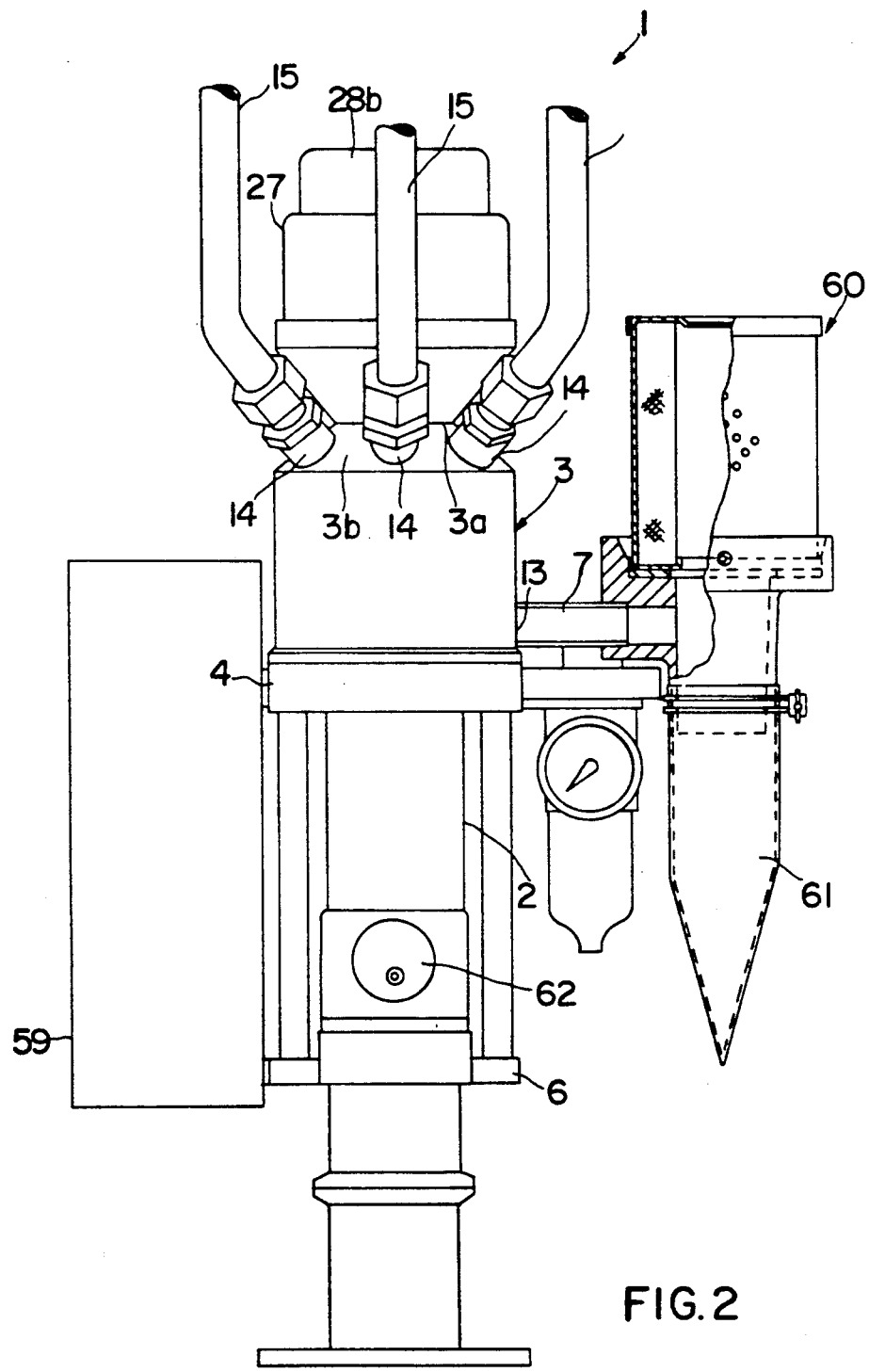
Figure 3:
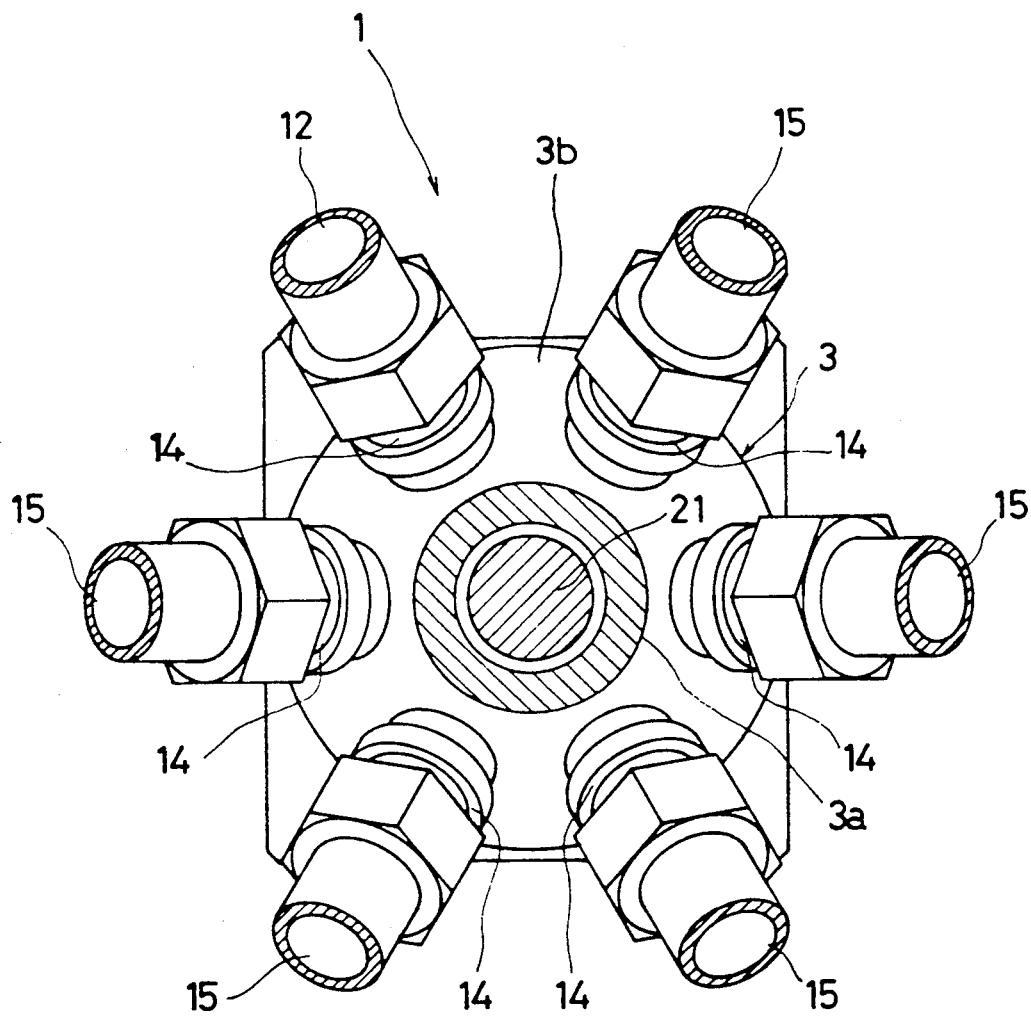
Figure 4:
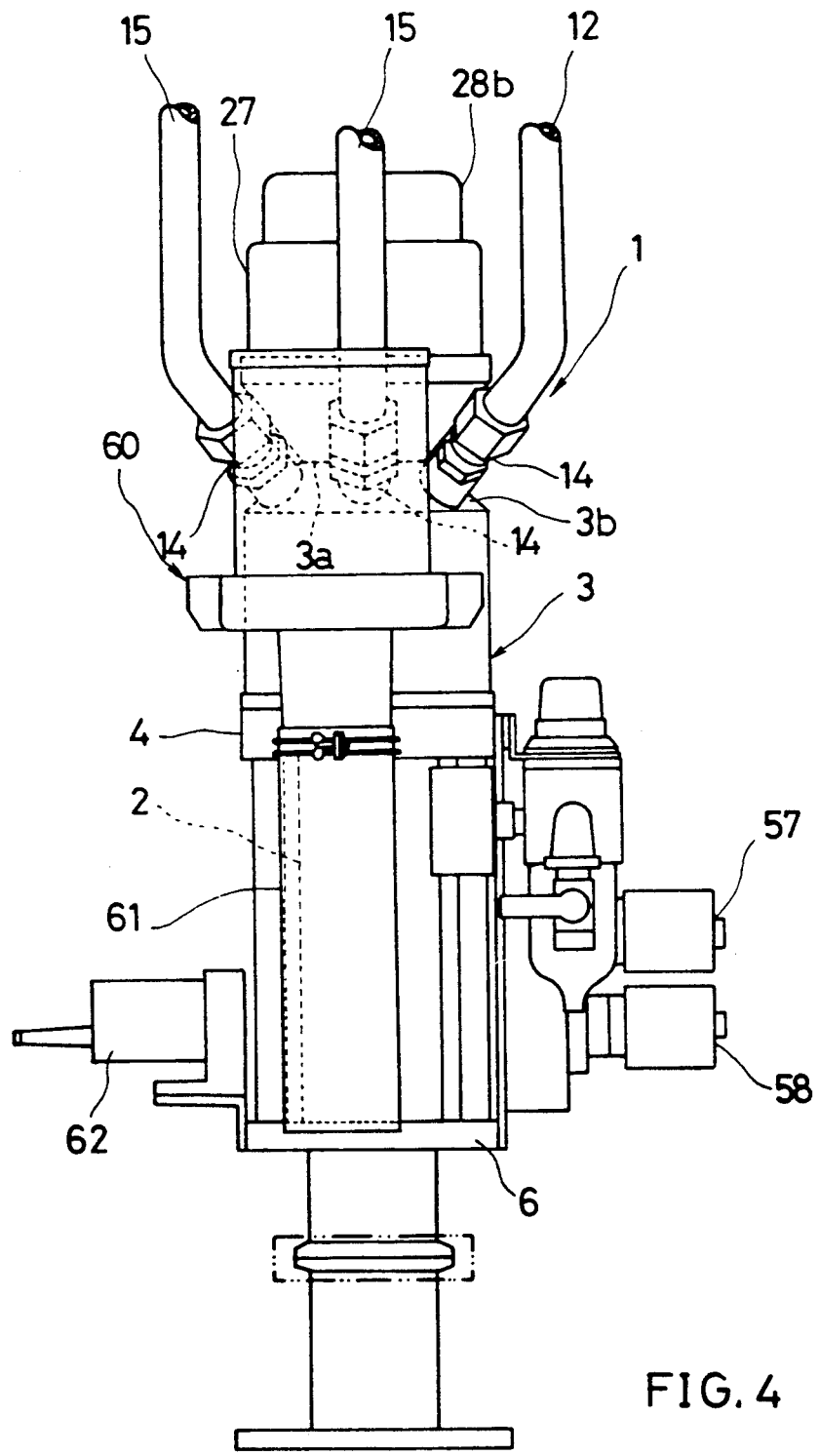
Figure 5:
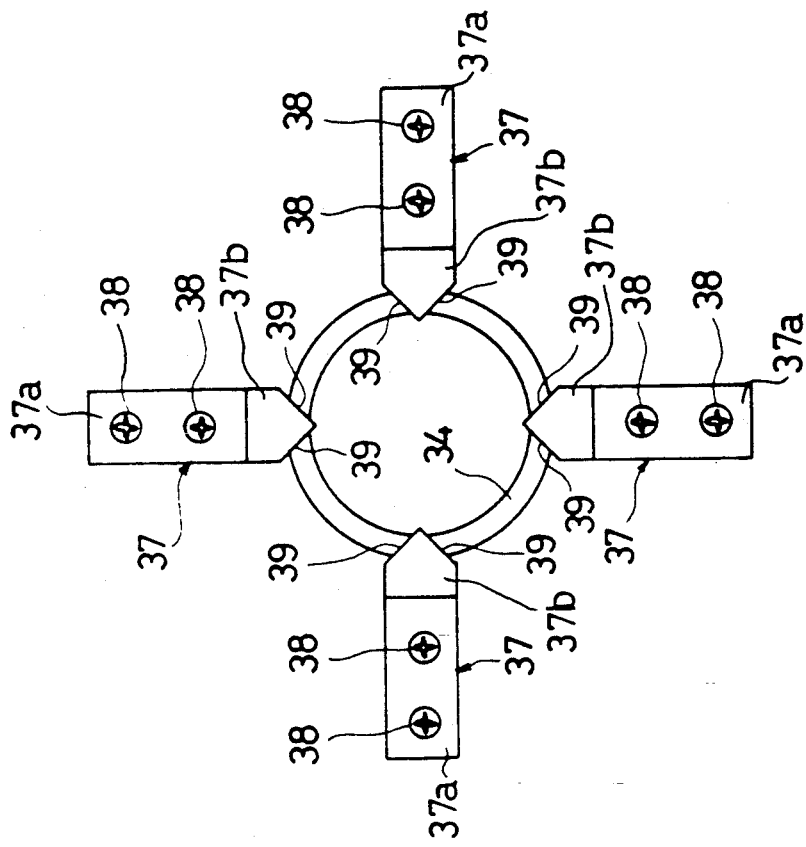

In FIG. 2, 59 is a control panel, 60 is a dust collection unit communicating with the exhaust port 13 via the exhaust pipe 7 via pipe 7, 61 is a dust container 61, and in FIGS. 2 and 4, 62 is a level instrument.

Figure 8:
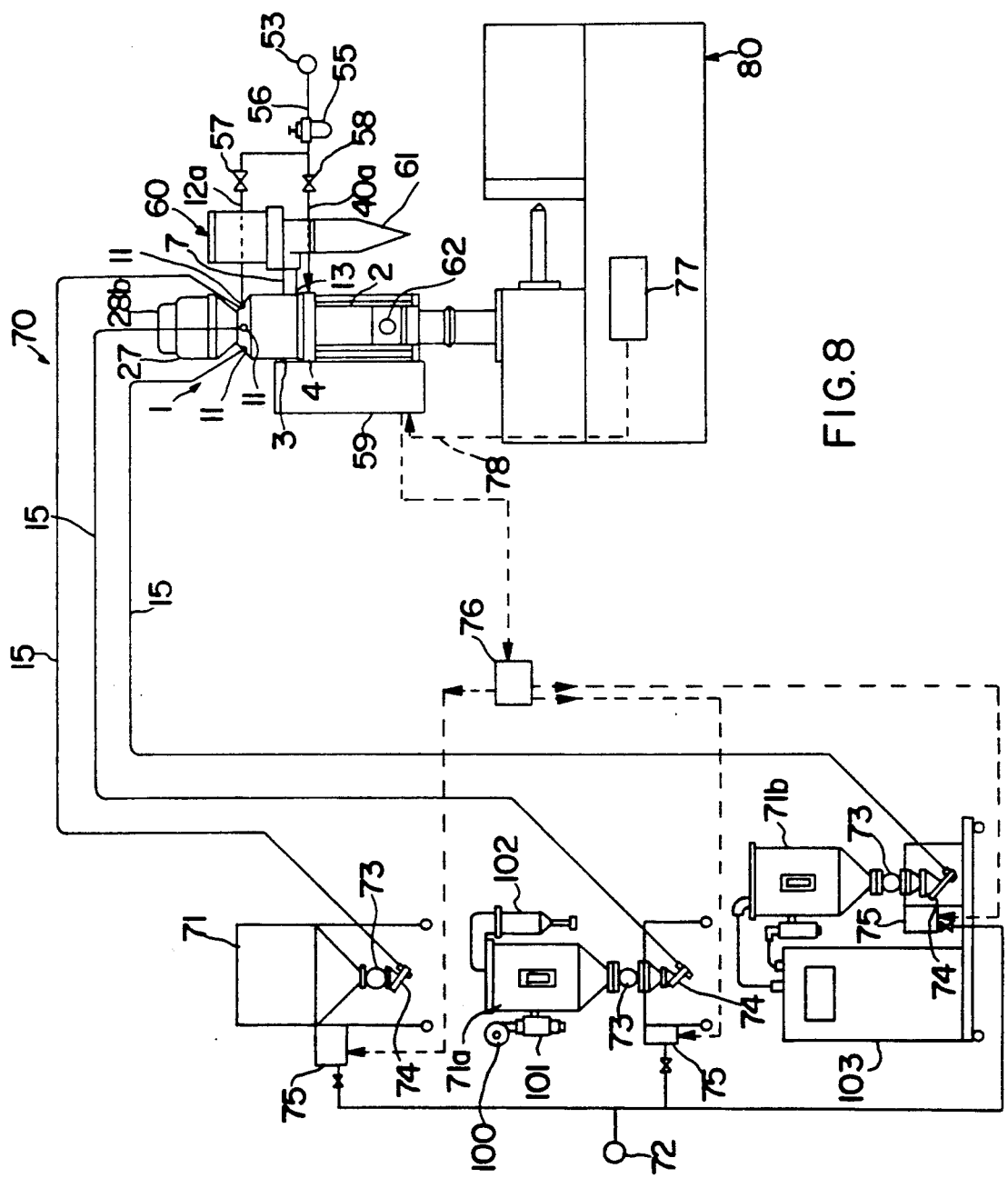
FIG. 8 is a front view of one example of incorporating the present invention into the pneumatic force transporting apparatus.

Next, a detailed description of an example to which the present invention is applied as shown in FIG. 8 is made as follows:

This FIGURE illustrates a system example for molding the plastic material, using the molding machine under an arrangement in which the pneumatic force transporting apparatus 70 and the synthetic resin molding machine 80 are connected to the upper-stream and lower-stream sides respectively of the collector 1 of the present invention.

The pneumatic force transporting apparatus 70 comprises a plurality of material supply sources 71, 71a, 71b . . . for containing the materials of a different kind, one pneumatic force source 72, such as the compressor and the like, for transporting the materials by the pneumatic force coming out of the gas including the air, the nitrogen and the like, and the transport pipes 15, 15 . . . connected by way of weighing equipment 73, 73 . . . such as a rotary valve and the like and mixers 74, 74, . . . to the material supply sources 71, 71a, 71b . . . respectively, the ends of the transport pipes 15, 15, . . . being connected to the inlets of materials 11, 11, . . . of the aforementioned collector 1. For this reason, an operation of switching the passage for guiding the materials 23 of the rotary valve 20 of the collector 1 to be brought in line with any desired one of the inlets of materials 11, 11, . . . and of actuating the pneumatic source 72 causes the pneumatic force coming out of the pneumatic source 72 to transport the materials from the specified material supply source 71, 71a, 71b . . . through the transport pipe 15 and the inlet of materials 11 to such a destination as the synthetic resin molding machine 80. In that case, as shown in FIG. 8, the pressuring-feeding type pneumatic force source 72 is used and another arrangement is to suction-transport the materials with the suction type pneumatic force source, such as the vacuum pump, the blower and the like, being provided on the side of the collector 1.

The material supply sources 71, 71a, 71b . . . , optionally selective, is preferably selected with a consideration paid to conditions including physical properties of the materials and the like. FIG. 8 illustrates one example comprising the material supply source 71 serving simply as a material hopper, the hopper-drier type material supply source 71a equipped with a heater unit 101 to which the blower 100 is connected and a dust collecting equipment 102, and the dehumidifying and drying type material supply source 71b equipped with a dehumidifying unit 103 for supplying the dehumidified air.

A mixer controller 75 is provided between the pneumatic force source 72 and each mixer 74, outer signals of the afore-mentioned control panel 59 such as the signal for classifying the materials and the like are, as shown by dotted lines, issued through a relay box 76 to the mixer controller 75, and turning-ON of the mixer controller 75 permits the desired kind of material to be fed into the collector 1.

77 is a control panel for the molding machine which transmits such signals as the signal for classifying the materials as shown by the dotted line and 78 is the signal for classifying the materials.

Figure 9:
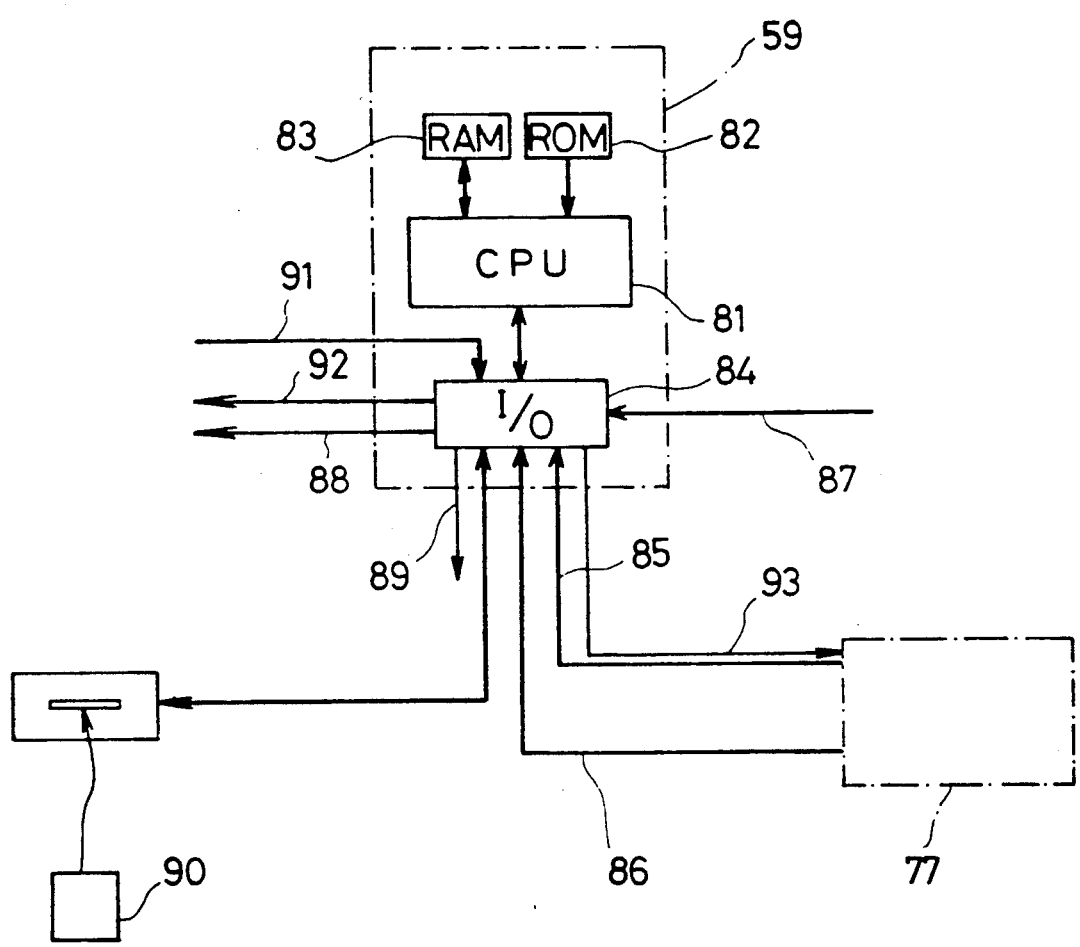
FIG. 9 is a control circuit diagram of a control panel of FIG. 8.

As shown in FIG. 9, a control circuit is constructed in the control panel 59 attached to the collector 1. The control circuit includes a central processing unit (CPU) 81 constituting the circuit as a main section, a read only memory (ROM) 82 in which a control program is written, a random access memory (RAM) 83 capable of executing WRITE/READ at any time, an input & output unit (I/O) 84, a data bus, and an address bus.

Detecting signals such as the signal for classifying the materials 85, a signal for demanding the materials 86, a signal from the level instrument 87 and the like are input as data for control operation and discrimination into the central processing unit (CPU) 81. On the other hand, various kinds of signals such as a signal for transporting signal 88 obtained as the operation result by the central processing unit (CPU) 81, a signal for cleaning the collector 89 and the like are output through the input & output unit (I/O) 84 from the central processing unit (CPU) 81. 91 is a position detecting signal, 92 is a rotary valve switching signal, and 93 is a switching completion signal.

It is further possible that the signals, such as the signal for classifying the materials and the like, which are stored into the synthetic resin molding machine 80, a computer, or the memory card 90 perform the material replacements by the rotational displacement of the rotary valve 20.

More specifically, the detecting signals such as a signal for classifying the materials 85 and for demanding the materials 86 and the like are inputted into the central processing unit (CPU) 81 by means of the input & output unit (I/O) 84 provided in the control panel 59.

The rotary valve switching signal 92, the transporting signal 88 and the switching completion 93 are outputted from the central processing unit (CPU) 81 by means of the input & output unit (I/O) 84 based upon the signal for classifying the materials 85 and the signal for demanding the materials 86. The material replacements can be performed by the rotational displacement of the rotary valve 20 controlled by the rotary valve switching signal, the transporting signal the switching completion signal.

An amount of supplying the materials to the passage for guiding the materials 23 of the rotary valve 20 is recommended to be stored into the memory card 90 which is attached to the control mechanism.

Figure 10:
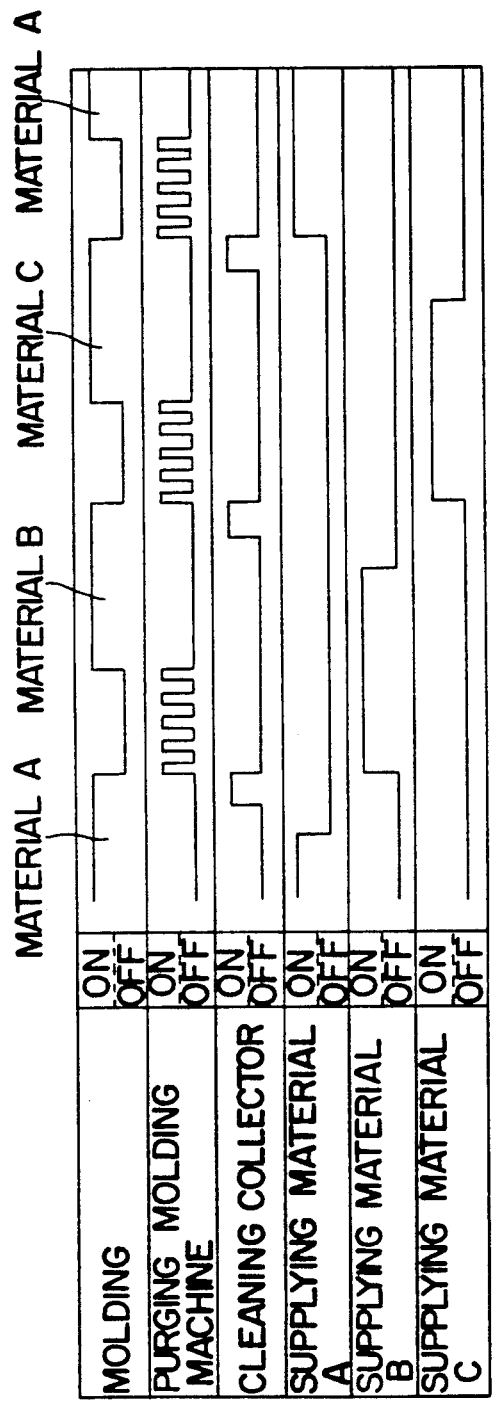
FIG. 10 is an operating view of actuating a system of FIG. 8.
Figure 11:
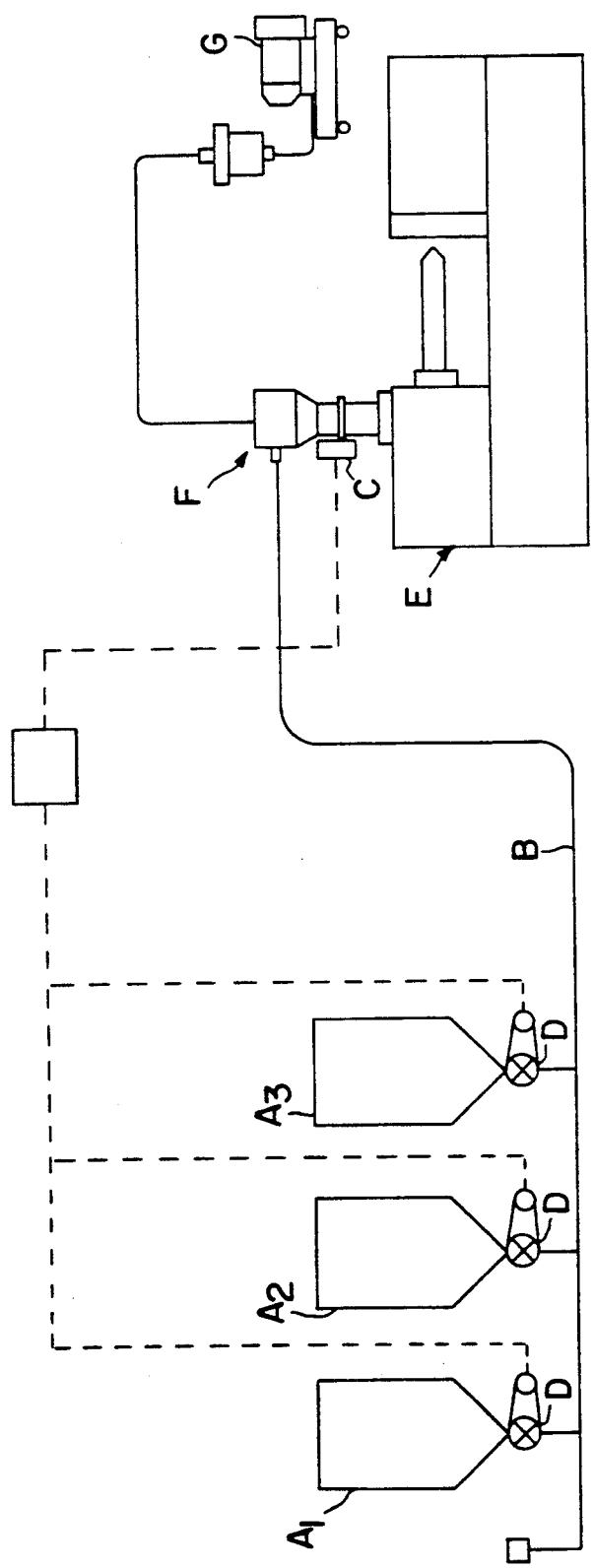
FIG. 11 is a front view of the conventional model.

The operating action of such a system as shown in FIG. 8 may be executed in such a manner as illustrated in FIG. 10 of the operating view.

What is claimed:

1. A multi material switching type collector comprising:
a separation box having a vacant chamber, said separation box being connected to said collector;
a rotary valve having one passage for guiding materials, said rotary valve being rotatably provided in said vacant chamber so as to be pressed to an inner wall face of said separation box;
a separator comprised of an upper separator and a lower separator with a slit in between;
said upper separator being provided on the bottom of said rotary valve so as to communicate with said passage; and
said lower separator being provided on the bottom of said separation box so as to face said upper separator;
a plurality of inlets for said materials, a gas introducing port and an exhaust port which are being provided on the outer wall of said separation box;
one of said inlets and said gas introducing port being selectively connected to said passage when said valve is rotated, and the other inlets and said gas introducing port which are not communicated with said passage being sealed by said rotary valve so that when one of said inlets is communicated with said passage, a replacement of materials is performed, and when said gas introducing port is communicated with said passage, compressed gas is supplied into said passage.

2. A multi material switching type collector according to claim 1,
wherein a plurality of spaced scrapers are provided in said space between said upper separator and said lower separator.

3. A multi material switching type collector according to claims 1 or 2,
wherein a gas supply means provided with a gas supply hole which is used for cleaning an inside of a main body of said collector is installed in a part that connects said separation box and said main body.

4. A multi material switching type collector according to claims 1 or 2,
wherein said rotary valve is controlled by a transporting signal, a rotary valve switching signal and a switching completion signal which are supplied from a central processing unit y means of an input and output unit, all of said signals being generated by material classifying signal and material demanding signal which are inputted to said central processing unit by means of said input and output unit.

5. A multi material switching type collector according to claim 3;
wherein said rotary valve is controlled by a transporting signal, a rotary valve switching signal and a switching completion signal which are supplied from a central processing unit by means of an input and output unit, all of said signals being generated by material classifying signal and material demanding signal which are inputted to said central processing unit by means of said input and output unit.

6. A multi material switching type collector according to claim 1 or 2,
wherein an amount of supplying materials, which are supplied into said passage of said rotary valve, is stored in a memory card which is attached to a control mechanism.

7. A multi material switching type collector according to claim 3,
wherein an amount of materials which are supplied into said passage of said rotary valve is stored in a memory card which is attached to a control mechanism.

8. A multi material switching type collector according to claim 4,
wherein an amount of materials which are supplied into said passage of said rotary valve is stored in a memory card which is attached to a control mechanism.

9. A multi material switching type collector according to claim 5,
wherein an amount of materials which are supplied into said passage of said rotary valve is stored in a memory card which is attached to a control mechanism.

10. A multi material switching type collector according to claim 1 or 2,
wherein a transport pipe, which is connected to an inlet for materials formed on an outer wall of a separation box, is as small in inner diameter as a dimension approximately 2-6 times larger than a maximum diameter of a particle of materials to be transported.

11. A multi material switching type collector according to claim 3,
wherein a transport pipe, which is connected to an inlet for materials formed on an outer wall of a separation box, is a small in inner diameter as a dimension approximately 2-6 times larger than a maximum diameter of a particle of materials to be transported.

12. A multi material switching type collector according to claim 4,
wherein a transport pipe, which is connected to an inlet for materials formed on an outer wall of a separation box, is as small in inner diameter as a dimension approximately 2-6 times larger than a maximum diameter of a particle of materials to be transported.

13. A multi material switching type collector according to claim 5,
wherein a transport pipe, which is connected to an inlet for materials formed on an outer wall of a separation box, is as small in inner diameter as a dimension approximately 2-6 times larger than a maximum diameter of a particle of materials to be transported.

14. A multi material switching type collector according to claim 6,
wherein a transport pipe, which is connected to an inlet for materials formed on an outer wall of a separation box, is as small in inner diameter as a dimension approximately 2-6 times larger than a maximum diameter of a particle of materials to be transported.

15. A multi material switching type collector according to claim 7,
wherein a transport pipe, which is connected to an inlet for materials formed on an outer wall of separation box, is as small in inner diameter as a dimension approximately 2-6 times larger than a maximum diameter of a particle of materials to be transported.

16. A multi material switching type collector according to claim 8,
wherein a transport pipe, which is connected to an inlet for materials formed on an outer wall of a separation box, is as small in inner diameter as a dimension approximately 2-6 times larger than a maximum diameter of a particle of materials to be transported.

17. A multi material switching type collector according to claim 9,
wherein a transport pipe, which is connected to an inlet for materials formed on an outer wall of a separation box, is a small in inner diameter as a dimension approximately 2-6 times larger than a maximum diameter of a particle of materials to be transported.

* * * * *